(12) United States Patent
Kurokawa

(10) Patent No.: US 9,350,264 B2
(45) Date of Patent: May 24, 2016

(54) CONTROL DEVICE OF POWER CONVERTER CIRCUIT

(75) Inventor: Fujio Kurokawa, Nagasaki (JP)

(73) Assignee: NAGASAKI UNIVERSITY, NATIONAL UNIVERSITY CORPORATION, Nagasaki-Shi, Nagasaki (JP)

( * ) Notice: Subject to any disclaimer, the term of this patent is extended or adjusted under 35 U.S.C. 154(b) by 357 days.

(21) Appl. No.: 13/638,545

(22) PCT Filed: Mar. 31, 2011

(86) PCT No.: PCT/JP2011/058367
§ 371 (c)(1),
(2), (4) Date: Dec. 17, 2012

(87) PCT Pub. No.: WO2011/122686
PCT Pub. Date: Oct. 6, 2011

(65) Prior Publication Data
US 2013/0094259 A1  Apr. 18, 2013

(30) Foreign Application Priority Data
Mar. 31, 2010 (JP) .................. 2010-084702

(51) Int. Cl.
*G05F 1/00* (2006.01)
*H02M 7/44* (2006.01)
*H02M 3/157* (2006.01)

(52) U.S. Cl.
CPC .............. *H02M 7/44* (2013.01); *H02M 3/157* (2013.01)

(58) Field of Classification Search
CPC .............................. H02M 3/157; H02M 3/156

USPC .............. 323/241, 282, 283, 322; 363/21.04, 363/21.13, 95, 97, 98
See application file for complete search history.

(56) References Cited

U.S. PATENT DOCUMENTS 6,373,735 B2 * 4/2002 Usui ............................ 363/89
7,449,869 B2 * 11/2008 Markowski ........... H02M 3/157
                                                            323/265

(Continued)

FOREIGN PATENT DOCUMENTS

| JP | 2004-304959 | 10/2004 |
| WO | 2009/122833 | 10/2009 |
| WO | WO 2009122833 A1 * | 10/2009 |

OTHER PUBLICATIONS

Fujio Kurokawa et al., "A Novel Digital Control Method for DC-DC Converter", Power Electronics and Motion Control Conference, 2008. EPE_PEMC 2008. 13th, Sep. 1, 2008, pp. 2434-2438.

(Continued)

*Primary Examiner* — Adolf Berhane
*Assistant Examiner* — Alex Torres-Rivera
(74) *Attorney, Agent, or Firm* — Kile Park Reed & Houtteman PLLC

(57) ABSTRACT

It provides the effective power conversion control technique which it can control which it made use of a characteristic (nature) of each A/D converter in. It comprises the third control part including the third operating circuit it inputs signal from third A/D converter inputting the detecting signal which is different from the detecting signal which is the same as the detecting signal or the detecting signal and above third A/D converter, and to generate the third operating signal, and the above actuating management circuit manages the actuating of an above first control part and the second above control part and the third above control part.

5 Claims, 8 Drawing Sheets

(56) References Cited

U.S. PATENT DOCUMENTS

| | | | | |
|---|---|---|---|---|
| 7,893,674 B2* | 2/2011 | Mok | ............... | H02M 3/157 323/283 |
| 8,143,871 B1* | 3/2012 | Gardner | ............ | H02M 3/157 323/282 |
| 2008/0048628 A1* | 2/2008 | Lee | ............ | H02M 3/158 323/271 |
| 2008/0252280 A1* | 10/2008 | Prodic | ............ | H02M 3/157 323/283 |
| 2009/0079401 A1* | 3/2009 | Mok et al. | ............ | 323/234 |
| 2009/0102446 A1* | 4/2009 | Takahashi et al. | ............ | 323/283 |
| 2010/0188062 A1* | 7/2010 | Candage et al. | ............ | 323/271 |
| 2011/0181260 A1* | 7/2011 | Kurokawa | ............ | 323/282 |

OTHER PUBLICATIONS

Fujio Kurokawa et al., "A Novel Digital PID Controlled DC-DC Converter", Power Electronics Electrical Drives Automation and Motion (SPEEDAM), 2010 International Symposium on, Jun. 14, 2010, pp. 50-53.

International Search Report of International Application No. PCT/JP2011/058367, dated Aug. 16, 2011.

* cited by examiner

CONTROL DEVICE OF POWER CONVERTER CIRCUIT

FIELD OF THE INVENTION

The present invention relates to a control device of a power converter circuit generating ON/OFF control signal for power conversion switch. The ON/OFF control signal is generated based on detecting signals such as output voltage, output current, electric switch current, and so on. By using characteristic of a analog-to-digital (hereinafter, "A/D") converter, efficient control can be performed.

TECHNICAL BACKGROUND

In a control device of a power converter circuit, detecting signals such as output voltage, output current, switch current, etc. are used for calculating a plurality of control elements.

FIG. 8 shows a power conversion system. In this power conversion system, an output voltage $e_o$ of a power converter circuit 9 is detected. A control device 8 drives a power conversion switch of the power converter circuit 9.

The control device 8 converts analog output voltage $e_o$ into digital voltage value by an A/D converter 81. The A/D converter 81 sends out the digital voltage value E_OUT to a first arithmetic logical unit 8211 and sends out to a second arithmetic logical unit 8212.

A result of an operation (output signal D1) of the first arithmetic logical unit 8211 is sent to an adder 822 of the subsequent stage.

Also, a result of an operation (output signal D2) of the second arithmetic logical unit 8212 is sent to the adder 822 of the subsequent stage, too.

The adder 822 outputs an addition result (output signal D) to a driving signal generation part 83 of the subsequent stage by an operation cycle of the first arithmetic logical unit 8211.

As a preceding patent document, PCT/JP2009/053773 (or U.S. Application Publication No. 2011/0181260) exists.

Problem to be Solved

Generally sampling rate goes low as resolution becomes higher in the A/D converter. If sampling rate of A/D converter 81 is higher in the control device 8 of FIG. 8, a response of the control device is high but accuracy is low.

On the contrary, if resolution of A/D converter 81 is high, accuracy of the control device is high but response is low.

The object of the present invention is to provide a control device of power converter circuit that performs A/D conversion of a detecting signal by A/D converter of "high resolution/low sampling rate" and by A/D converter of "low resolution/high sampling rate".

Means to Solve the Problem

In a stationary state, sampling rate of an A/D converter circuit may be low, however resolution of the A/D converter circuit has to be high.

In a transient state, sampling rate of an A/D converter circuit has to be high, however resolution of the A/D converter circuit may be low.

When a certain arithmetic is performed about a certain data, a part of data is calculated with a low bit (e.g., resolution 8 bit) and other parts are calculated with a high bit (e.g., resolution 16-bit).

That is, an A/D converter of high-speed low bit (e.g., 8 bit) and an A/D converter of a low-speed high bit (e.g., 16-bit) are used.

High-speed high bit A/D converter has not to be used by carrying out this invention.

A control device of power converter circuit which generates switch operating time data based on at least one detecting signal among output voltage, output current, electric switch current and electric reactor current, and generates ON/OFF control signal for power conversion switch based on the switch operating time data, comprising:

a first control part which includes a first A/D converter that inputs the at least one detecting signal and performs A/D conversion, and a first operating circuit that generates first operation signal by inputting digital signal from the first A/D converter, a second control part which includes a second A/D converter that inputs the at least one detecting signal and performs A/D conversion, and a second operating circuit that generates second operation signal by inputting digital signal from the second A/D converter, a third control part which includes a third A/D converter that inputs the at least one detecting signal and performs A/D conversion, and a third operating circuit that generates third operation signal by inputting digital signal from the third A/D converter, a switch operating time data generation part which synthesizes the first operation signal, the second operation signal and the third operation signal, and generates the switch operating time data, a driving signal generation part which generates ON/OFF control signal for the power conversion switch, and a operation management circuit which manages the first control part, the second control part, the third control part, the switch operating time data generation part and the driving signal generation part, wherein (a) the first A/D converter, the second A/D converter and the third A/D converter have next relations, sampling rate of the first A/D converter≥sampling rate of the second A/D converter≥sampling rate of the third A/D converter, sampling rate of the first A/D converter≥sampling rate of the third A/D converter≥sampling rate of the second A/D converter, and, resolution of the first A/D converter≤resolution of the second A/D converter≤resolution of the third A/D converter, or, resolution of the first A/D converter≤resolution of the third A/D converter≤resolution of the second A/D converter, (b) the first operating circuit, the second operating circuit and the third operating circuit have next relations, unit operating time of the first operating circuit≤unit operating time of the second operating circuit≤unit operating time of the third operating circuit, or, unit operating time of the first operating circuit≤unit operating time of the third operating circuit≤unit operating time of the second operating circuit, where unit operating time is a time required for each operating circuit generating one result of an operation.

The control device of power converter circuit may further include a filter before the first A/D converter, the second A/D converter and the third A/D converter, respectively.

The control device of the power converter circuit may further include an amplifier before the first A/D converter. The amplifier clips the detecting signal in predetermined range width and amplifies it.

In the control device of the power converter circuit, the calculation number of times of the first operating circuit by one ON/OFF period of power conversion switch may be more than the calculation number of times of the second operating circuit and the third operating circuit.

In the control device of the power converter circuit, the calculation result of the first operating circuit is updated at least one time in one ON/OFF period of the power conversion switch.

Effect of the Invention

In the present invention, A/D converters of "high resolution/low sampling rate" and "low resolution/high sampling rate" are used.

When the output of the power converter circuit changes dynamically, the arithmetic by the control part of "low resolution/high sampling rate" occupies larger ratio.

When the output of the power converter circuit changes little, the arithmetic by the control part of "high resolution/low sampling rate" occupies larger ratio.

According to the present invention, an A/D converter used for control part of "high resolution/low sampling rate" and an A/D converter used for control part of "low resolution/high sampling rate" are not expensive.

Therefore, production cost of the control device can become lower.

Specifically, a price of A/D converter of 8 bit or less is low.

A price of A/D converter of greater than 8 bit suddenly becomes higher.

Low-speed A/D converter of greater than 8 bit can be manufactured, for example, by combination of a plurality of A/D converter of 8 bit or less.

When output voltage changes dynamically, the stability of the output voltage of the control device of the present invention is high.

Therefore, a capacitor of small capacity can be adopted as an output capacitor of the power converter circuits.

As a result, small power consumption can be achieved.

For example, the total power consumption of a high-speed 8 bit A/D converter and a low-speed 16 bit A/D converter is smaller than the power consumption of a high-speed 16 bit A/D converter.

The recent electronic devices may repeat a sleep mode and an active mode every several minutes or every dozens of seconds.

Thus, the control device of the present invention is suitable for the power supply of such electronic devices.

DETAILED DESCRIPTION OF THE INVENTION

Figure 4:
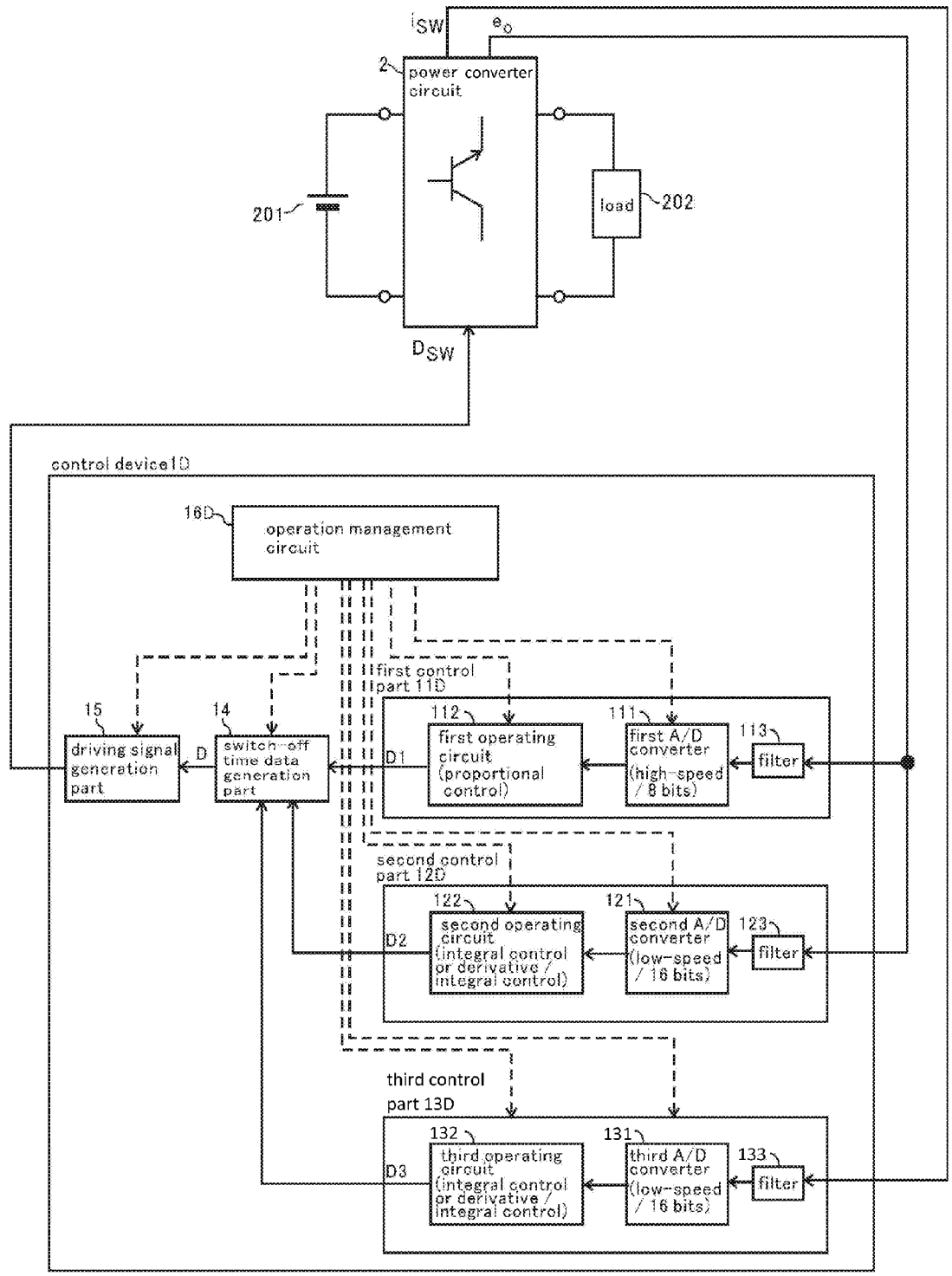
FIG. 4 is explanatory drawing showing an embodiment of the present invention.

FIG. 4 is explanatory drawing showing another embodiment of the present invention. In FIG. 4, a control device 1D is comprised of a first control part 11D, a second control part 12D, a third control part 13D, a switch-off time data generation part 14, a driving signal generation part 15 and an operation management circuit 16D.

Figure 5:
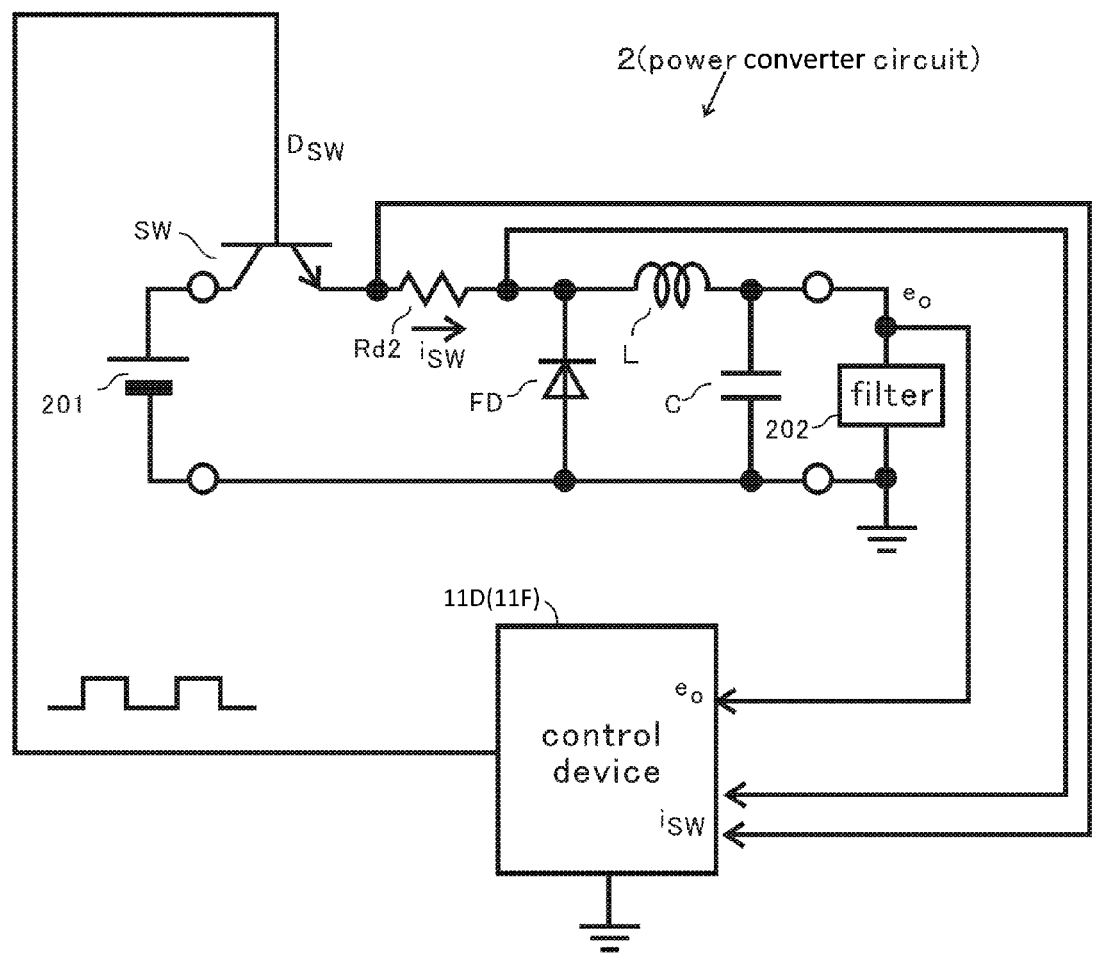
FIG. 5 is explanatory drawing of a power conversion system in which one detecting signal is output voltage and another one is switch current of a power converter circuit.

In this embodiment, as shown in a circuit diagram of FIG. 5, the power converter circuit 2 is comprised of a power conversion switch SW, a flywheel diode FD, a reactor L and a capacitor C. A DC power supply 201 is connected to an input side of the power converter circuit 2, and a load 202 is connected to an output side of the power converter circuit 2, and the output voltage $e_o$ and switch current $i_{SW}$ are sent out to the control device 1D.

The first control part 11D is comprised of a first A/D converter 111, a first operating circuit 112 and a filter 113. The first control part 11D inputs the output voltage $e_o$ and generates a first operating signal (output signal D1). The first operating circuit 112 inputs a digital signal from the first A/D converter 111 and generates a proportional control signal. The first A/D converter 111 is a high-speed/8 bit one.

The second control part 12D is comprised of a second A/D converter 121, a second operating circuit 122 and a filter 123. The second control part 12D inputs the output voltage $e_o$ and generates a second operating signal (output signal D2). The second operating circuit 122 inputs a digital signal from the second A/D converter 121 and generates an integral control or a derivative/integral control signal. The second A/D converter 121 is a low-speed/16 bit one.

The third control part 13D is comprised of a third A/D converter 131, a third operating circuit 132 and a filter 133. The third control part 13D inputs the switch current $i_{SW}$ and generates a third operating signal (output signal D3). Third operating circuit 132 inputs a digital signal from the third A/D converter 131 and generates an integral control or a derivative/integral control signal. The third A/D converter 131 is a low-speed/16 bit one.

The operation management circuit 16D manages operation of the first control part 11D, the second control part 12D and the third control part 13D.

In this embodiment, the first A/D converter 111, the second A/D converter 121 and the third A/D converter 131 have next relations, sampling rate of the first A/D converter>sampling rate of the second A/D converter=sampling rate of the third A/D converter and resolution of the first A/D converter<resolution of the second A/D converter=resolution of the third A/D converter Even more, the first operating circuit 112, the second operating circuit 122 and the third operating circuit 132 have next relations, unit operating time of first operating circuit<unit operating time of the second operating circuit≤unit operating time of the third operating circuit or, unit operating time of the first operating circuit<unit operating time of the third operating circuit≤unit operating time of the second operating circuit, where the unit operating time is a time required for each operating circuit generating one result of an operation.

The switch-off time data generation part 14 synthesizes input signal D1, input signal D2, and input signal D3 and generates output signal D as a switch operating time data of the power conversion switch SW, which is a switch-off time data in this embodiment.

Figure 1:
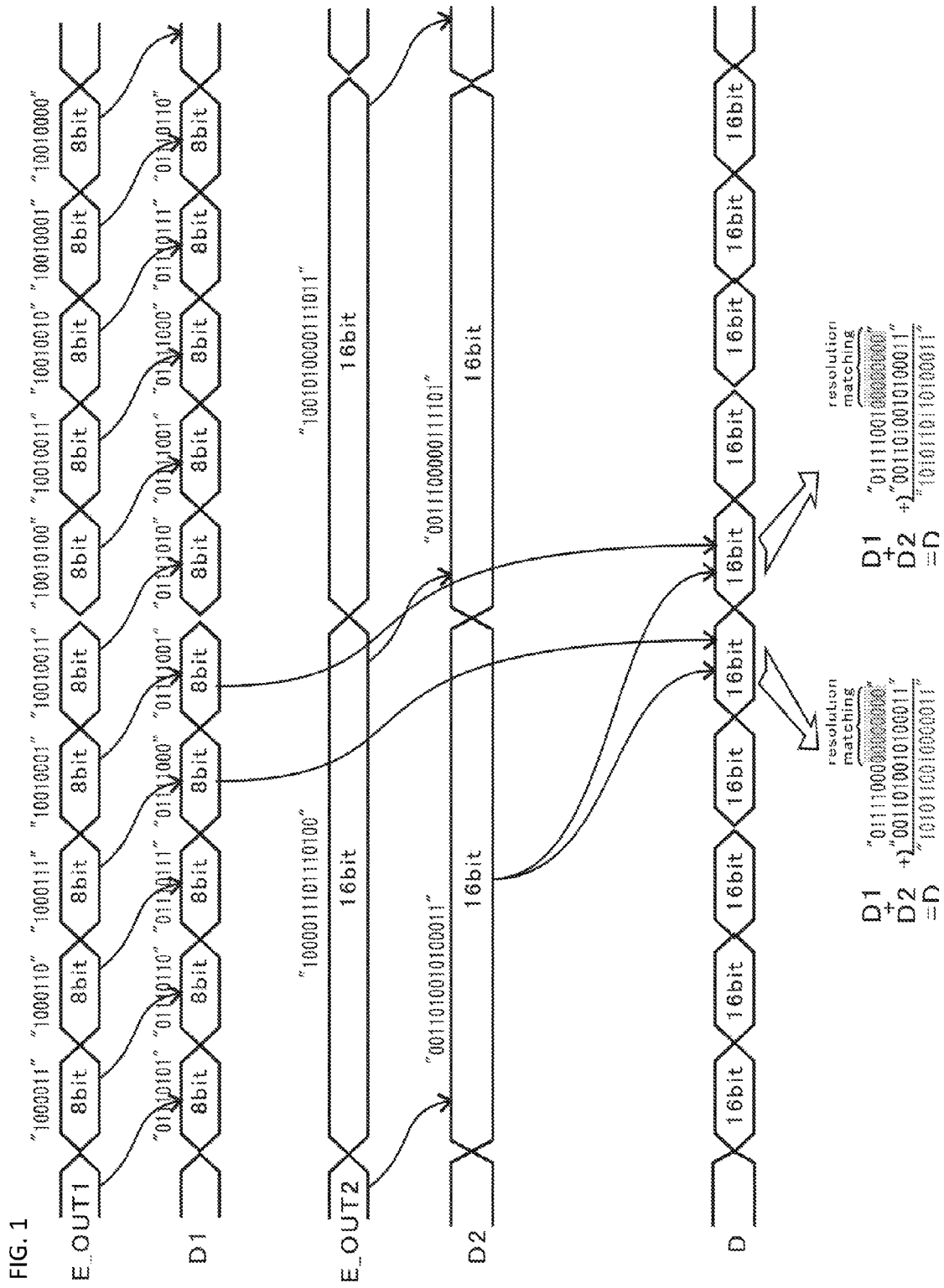
FIG. 1 is a figure showing examples of the calculation number of times of the first operating circuit and the second operating circuit per one ON/OFF period of the power conversion switch.

As shown in FIG. 1, a calculation number of times of the first operating circuit 112 per one ON/OFF period of the power conversion switch may exceed a calculation number of times of the second operating circuit 122.

In one ON/OFF period of the power conversion switch, the switch-off time data generation part 14 can update the computed result of the first operating circuit 112 several times.

The switch-off time data generation part 14 can thereby generate the switch operating time data in a cycle which is shorter than the unit operating time of the second operating circuit 122.

The driving signal generation part 15 generates ON/OFF control signal for the power conversion switch according to the switch operating time data.

Figure 6:
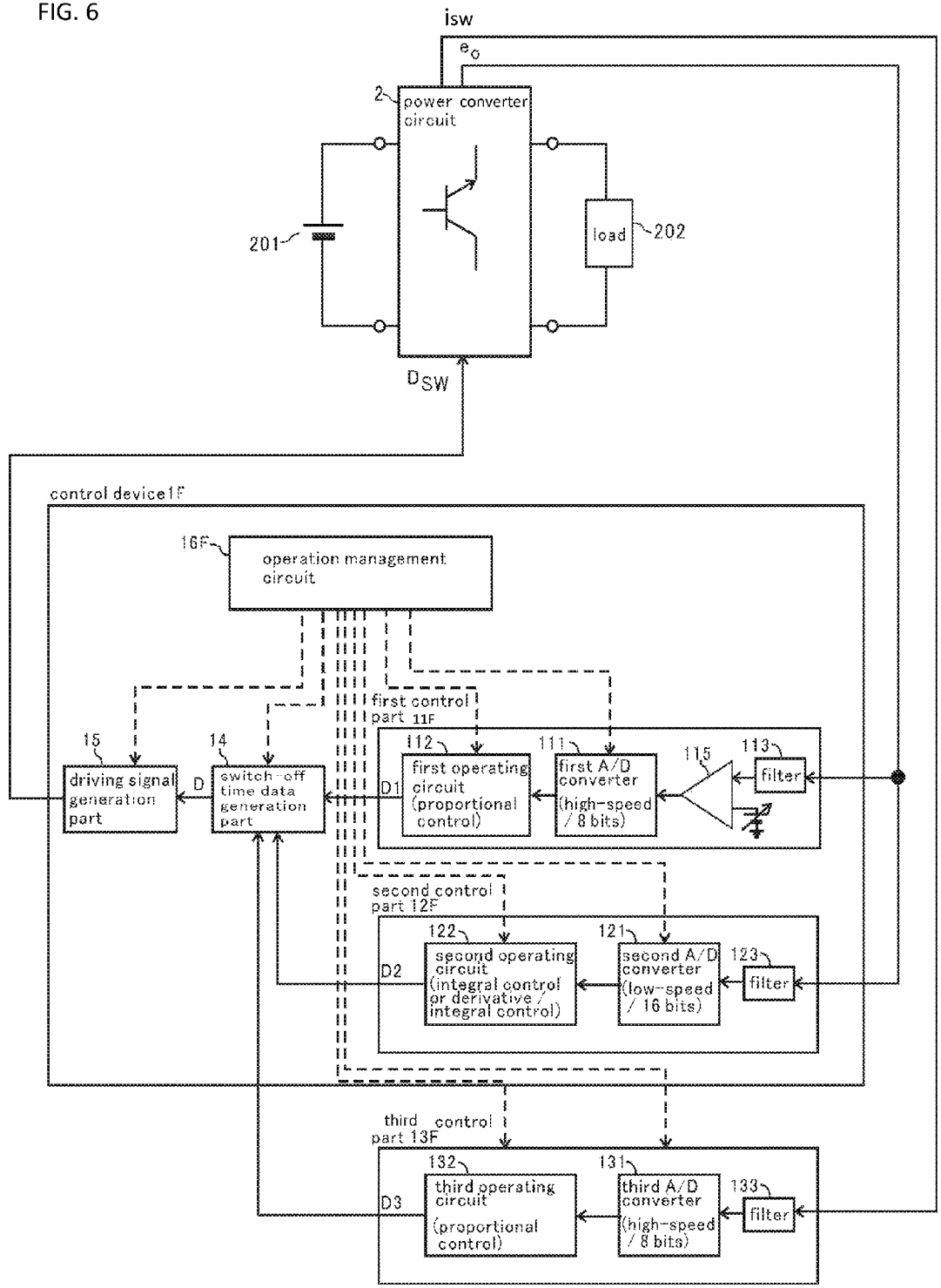
FIG. 6 is explanatory drawing showing another embodiment of the present invention.

FIG. 6 is explanatory drawing showing another embodiment of the present invention. In FIG. 6, a control device 1F is comprised of a first control part 11F, a second control part 12F, a third control part 13F, a switch-off time data generation part 14, a driving signal generation part 15 and an operation management circuit 16F. The first control part 11F is comprised of a first A/D converter 111, a first operating circuit 112, a filter 113 and an amplifier 115 provided just before the first A/D converter 111.

Figure 3:
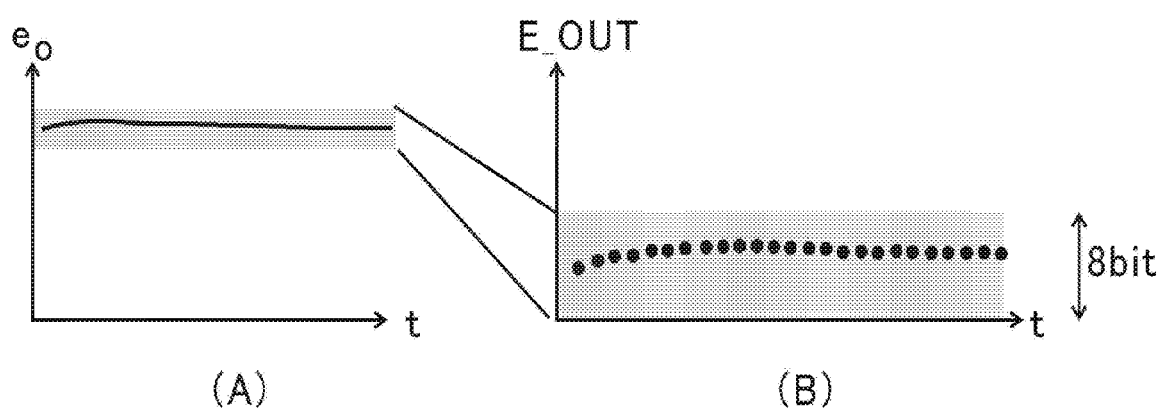
FIG. 3 is an illustration which shows clipping a detecting signal by an amplifier.

The amplifier 115 inputs an output voltage $e_o$ of a power converter circuit 2, and clips it in the predetermined value width (see FIG. 3(A)) and amplifies it (see FIG. 3(B)).

The first operating circuit 112 inputs a digital signal from the first A/D converter 111 and generates a proportional control signal (output signal D1). The first A/D converter 111 is a high-speed/8 bit one.

The second control part 12F is comprised of a second A/D converter 121, a second operating circuit 122 and a filter 123. The second control part 12F inputs the output voltage $e_o$ and generates a second operating signal (output signal D2). The second operating circuit 122 inputs a digital signal from the second A/D converter 121 and generates an integral control or a derivative/integral control signal. The second A/D converter 121 is a low-speed/16 bit one.

The third control part 13F is comprised of a third A/D converter 131, a third operating circuit 132 and a filter 133. The third control part 13F inputs the switch current $i_{SW}$ and generates a third operating signal (output signal D3). The third operating circuit 132 inputs a digital signal from the third A/D converter 131 and generates a proportional control signal. The third A/D converter 131 is a high-speed/8 bit one.

The operation management circuit 16F manages operation of the first control part 11F, the second control part 12F and the third control part 13F.

In this embodiment, sampling rate of the first A/D converter 111, sampling rate of the third A/D converter 113 and sampling rate of the second A/D converter 121 have next relations, sampling rate of first A/D converter 111=sampling rate of third A/D converter 131>sampling rate of second A/D converter 121

Even more, unit operating time of the first operating circuit 112, unit operating time of the third operating circuit 132, unit operating time of the second operating circuit 122 have next relations, unit operating time of the first operating circuit 112=unit operating time of the third operating circuit 132<unit operating time of the second operating circuit 122

Figure 2:
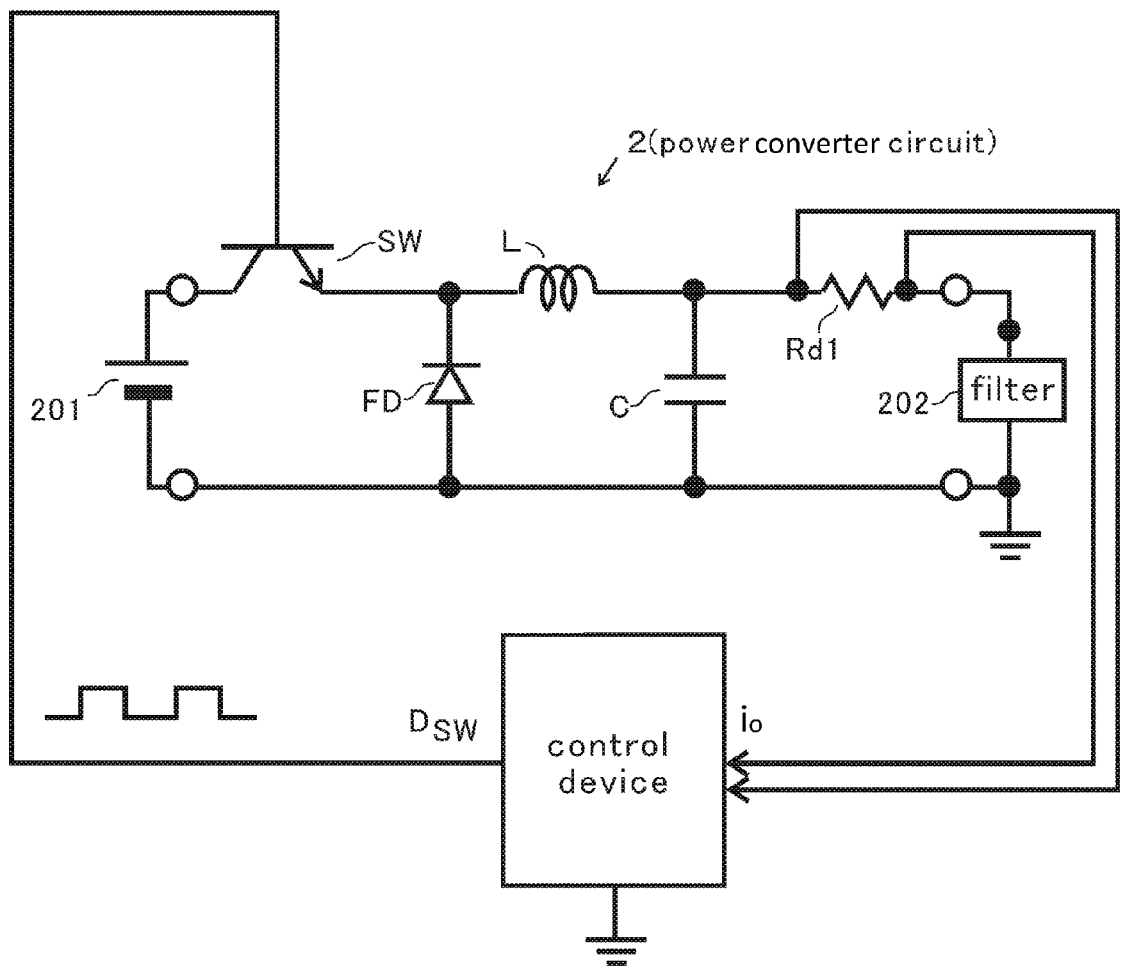
FIG. 2 is explanatory drawing of a power conversion system in which a detecting signal is output current of a power converter circuit.
Figure 7:
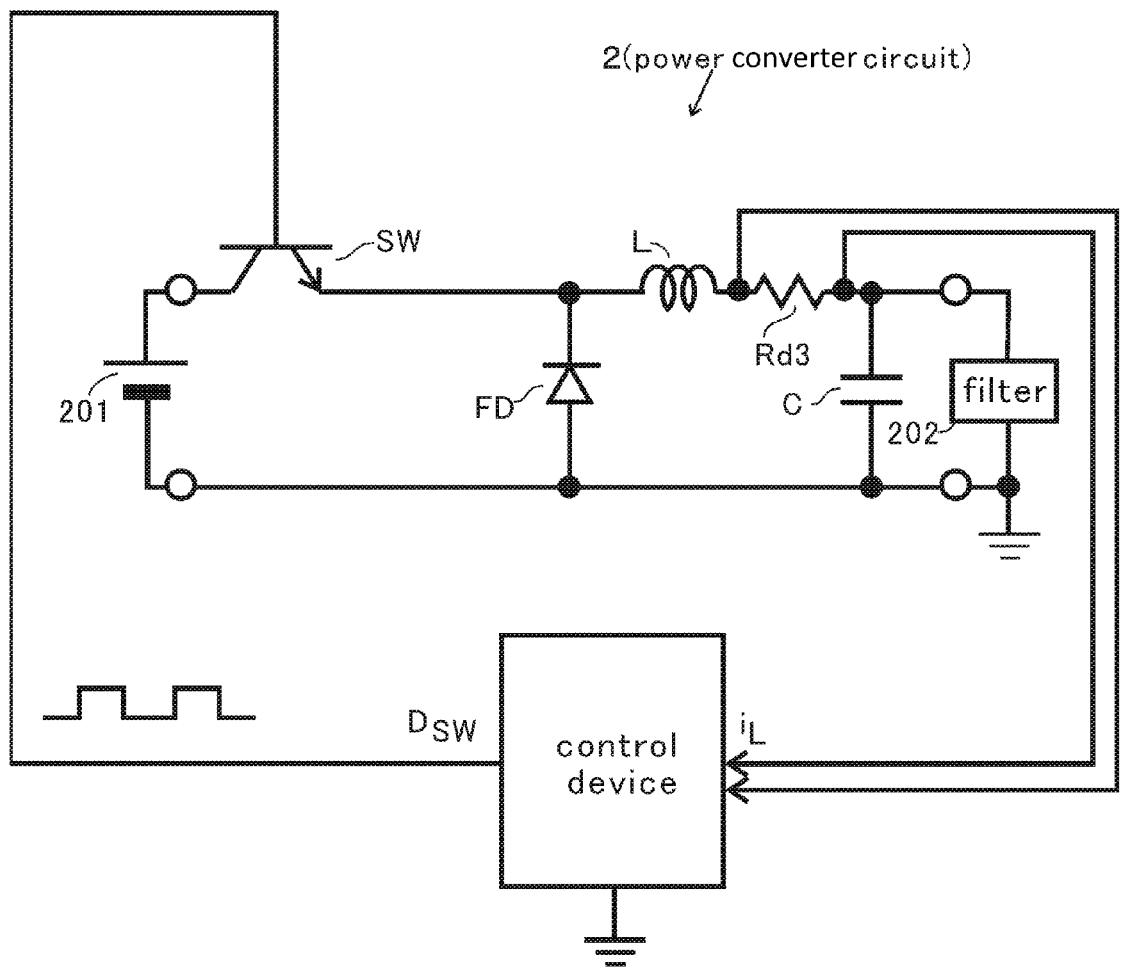
FIG. 7 is explanatory drawing of a power conversion system in which a detecting signal is reactor current of a power converter circuit.
Figure 8:
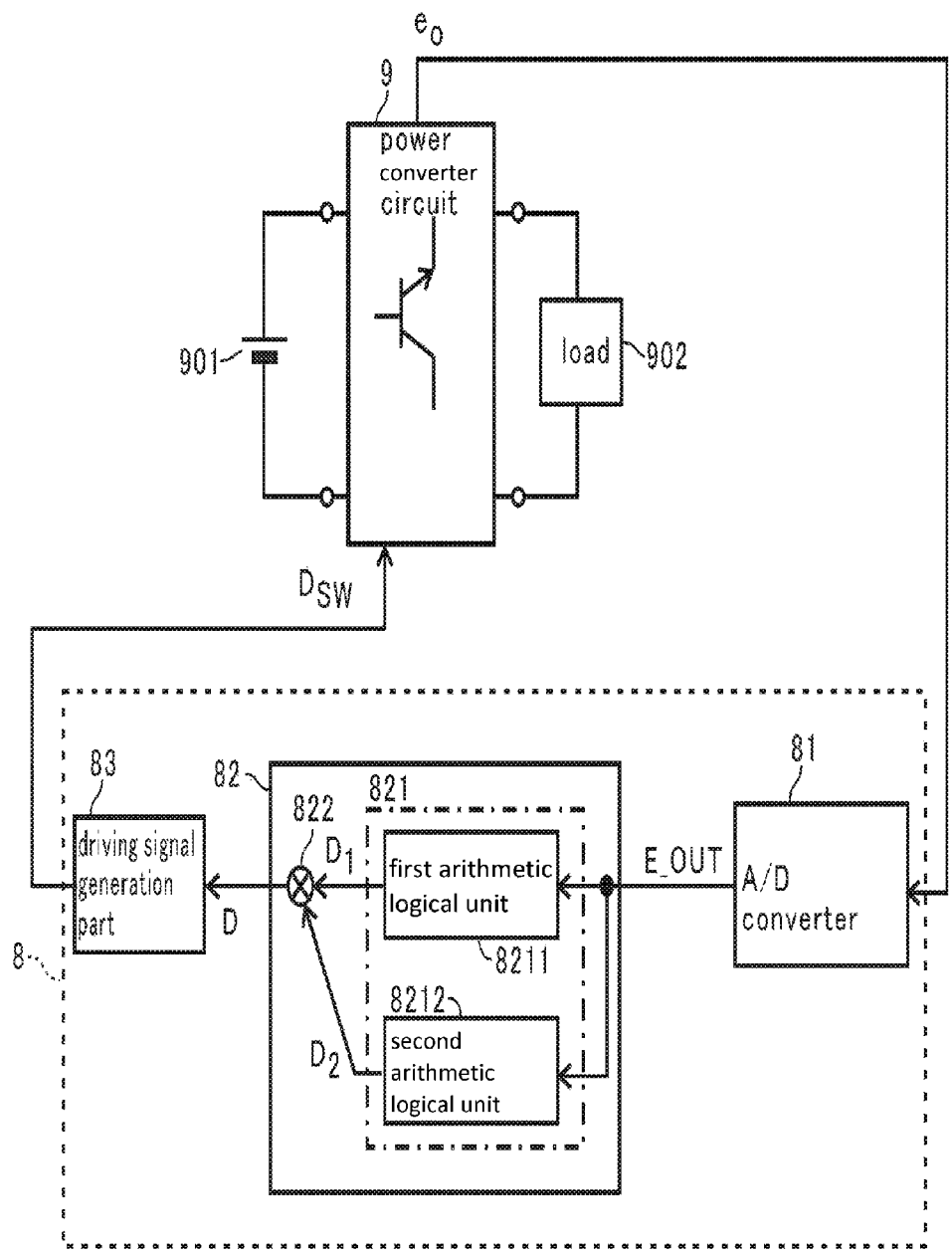
FIG. 8 is explanatory drawing of a conventional control device of a power converter circuit.

A switch-off time data generation part 14 synthesizes input signal D1, input signal D2, and input signal D3, and generates output signal D as a switch operating time data of the power conversion switch SW. And the driving signal generation part 15 generates ON/OFF control signal for the power conversion switch according to the switch operating time data. According to the present invention, an output current $i_o$ (see FIG. 2) and/or electric reactor current $i_L$ (see FIG. 7) of a power converter circuit 2 may be used as a detecting signal.

Also, in the embodiment, the ON/OFF control signal is a switch-off time signal.

However, the present invention is not limited to above.

When the ON/OFF control signal is a switch-on time signal, the present invention is applied.

When the ON/OFF control signals are switch-on time signal and switch-off time signal, the present invention is applied too.

Power converter circuit is often operated by an analog control device.

With an analog control device, operating characteristic depends on characteristic of configuration elements.

Thus, there are various kinds of disadvantages such as accuracy of component properties, heterogeneity of the quality, limitation of the operating range due to device characteristic, and others. The development of the digital controller is desired to overcome such disadvantages.

However, an A/D converter of the high-speed/16-bit, which is necessary in a conventional digital control device having the same performance as an analog control device, is expensive.

Market demands a digital control device of which price is same as an analog control device.

In case of an analog control device, it must adopt a capacitor of large-capacity as an output capacitor of a power converter circuit.

Control device of the present invention is implemented in digital circuit.

Thus, the control device is downsized in comparison with the analog control device, and production cost can be reduced.

The invention claimed is:

1. A control device of a power converter circuit which generates switch operating time data based on at least one detecting signal among output voltage, output current, electric switch current and electric reactor current, and generates ON/OFF control signal for a power conversion switch based on the switch operating time data, comprising:

a first control part which includes a first analog-to-digital converter that inputs the at least one detecting signal and performs analog-to-digital conversion, and a first operating circuit that generates first operation signal by inputting a first digital signal from the first analog-to-digital converter, a second control part which includes a second analog-to-digital converter that inputs the at least one detecting signal and performs analog-to-digital conversion, and a second operating circuit that generates second operation signal by inputting a second digital signal from the second analog-to-digital converter, a third control part which includes a third analog-to-digital converter that inputs the at least one detecting signal and performs analog-to-digital conversion, and a third operating circuit that generates third operation signal by inputting a third digital signal from the third analog-to-digital converter, a switch operating time data generation part which synthesizes the first operation signal, the second operation signal and the third operation signal, and generates the switch operating time data, a driving signal generation part which generates ON/OFF control signal for the power conversion switch, and an operation management circuit which manages the first control part, the second control part, the third control part, the switch operating time data generation part and the driving signal generation part, wherein (a) the first analog-to-digital converter, the second analog-to-digital converter and the third analog-to-digital converter comprise following relations, sampling rate of the first analog-to-digital converter≥sampling rate of the second analog-to-digital converter≥sampling rate of the third analog-to-digital converter, or, sampling rate of the first analog-to-digital converter≥sampling rate of the third analog-to-digital converter≥sampling rate of the second analog-to-digital converter, and, resolution of the first analog-to-digital converter≤resolution of the second analog-to-digital converter≤resolution of the third analog-to-digital converter, or, resolution of the first analog-to-digital converter≤resolution of the third analog-to-digital converter≤resolution of the second analog-to-digital converter, (b) the first operating circuit, the second operating circuit and the third operating circuit comprise following relations, unit operating time of the first operating circuit≤unit operating time of the second operating circuit≤unit operating time of the third operating circuit, or, unit operating time of the first operating circuit≤unit operating time of the third operating circuit≤unit operating time of the second operating circuit, where unit operating time is a time required for each operating circuit generating one result of an operation.

2. The control device of the power converter circuit according to claim 1, wherein a first filter is coupled to a first analog-to-digital converter input, a second filter is coupled to a second analog-to-digital converter input and a third filter is coupled to a third analog-to-digital converter input.

3. The control device of the power converter circuit according to claim 1, wherein an amplifier which clips the detecting signal in predetermined range width and amplifies the detecting signal is coupled to a first analog-to-digital converter input.

4. The control device of the power converter circuit according to claim 1, wherein a calculation number of times of the first operating circuit in one ON/OFF period of the power conversion switch is more than a calculation number of times of the second operating circuit and the third operating circuit.

5. The control device of the power converter circuit according to claim 1, wherein a calculation result of the first operating circuit is updated at least one time in one ON/OFF period of the power conversion switch.

* * * * *